O. P. STARK.
EXTENSION FEEDER FOR GRAIN THRESHERS OR SEPARATORS.
APPLICATION FILED MAY 17, 1916.
1,232,405.
Patented July 3, 1917.
5 SHEETS—SHEET 5.
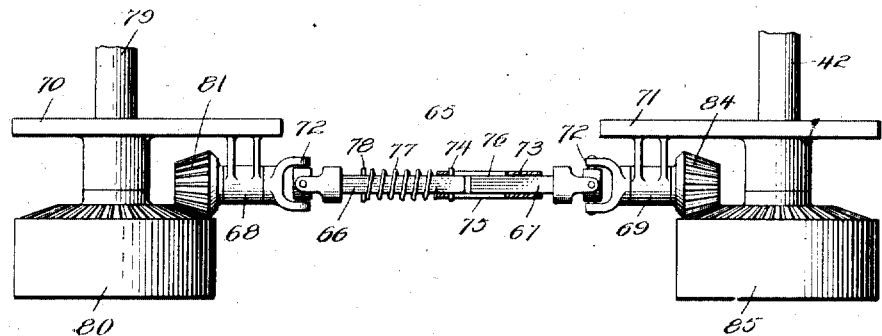
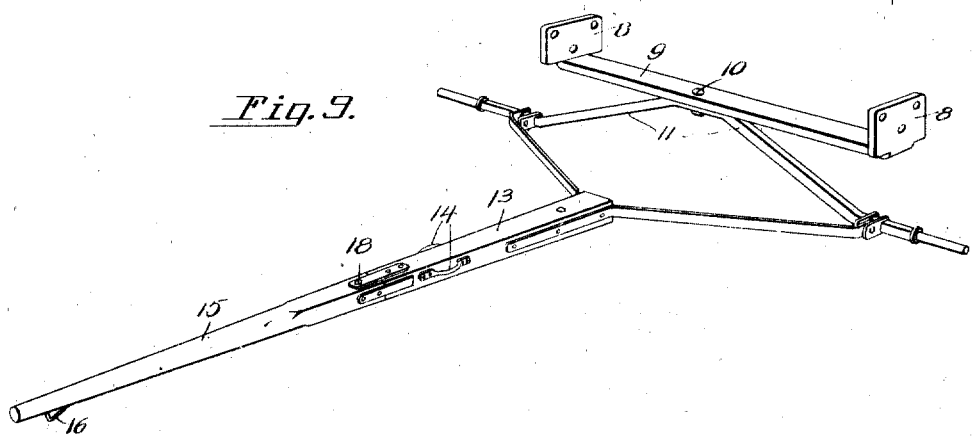
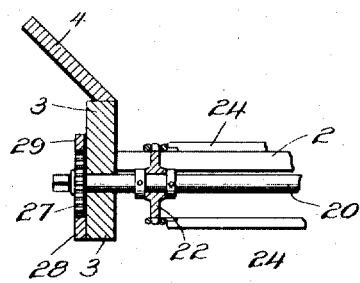
Inventor
O. P. Stark.
Witnesses
F. C. Gibson.
C. C. Hines.
By Victor J. Evans
Attorney

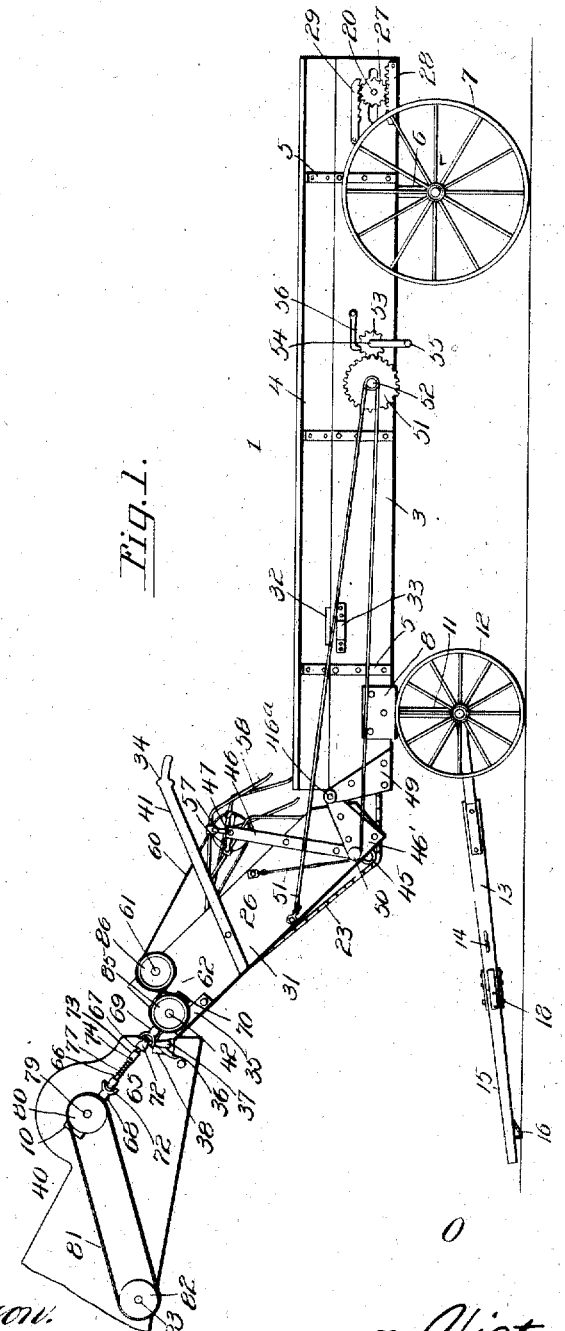

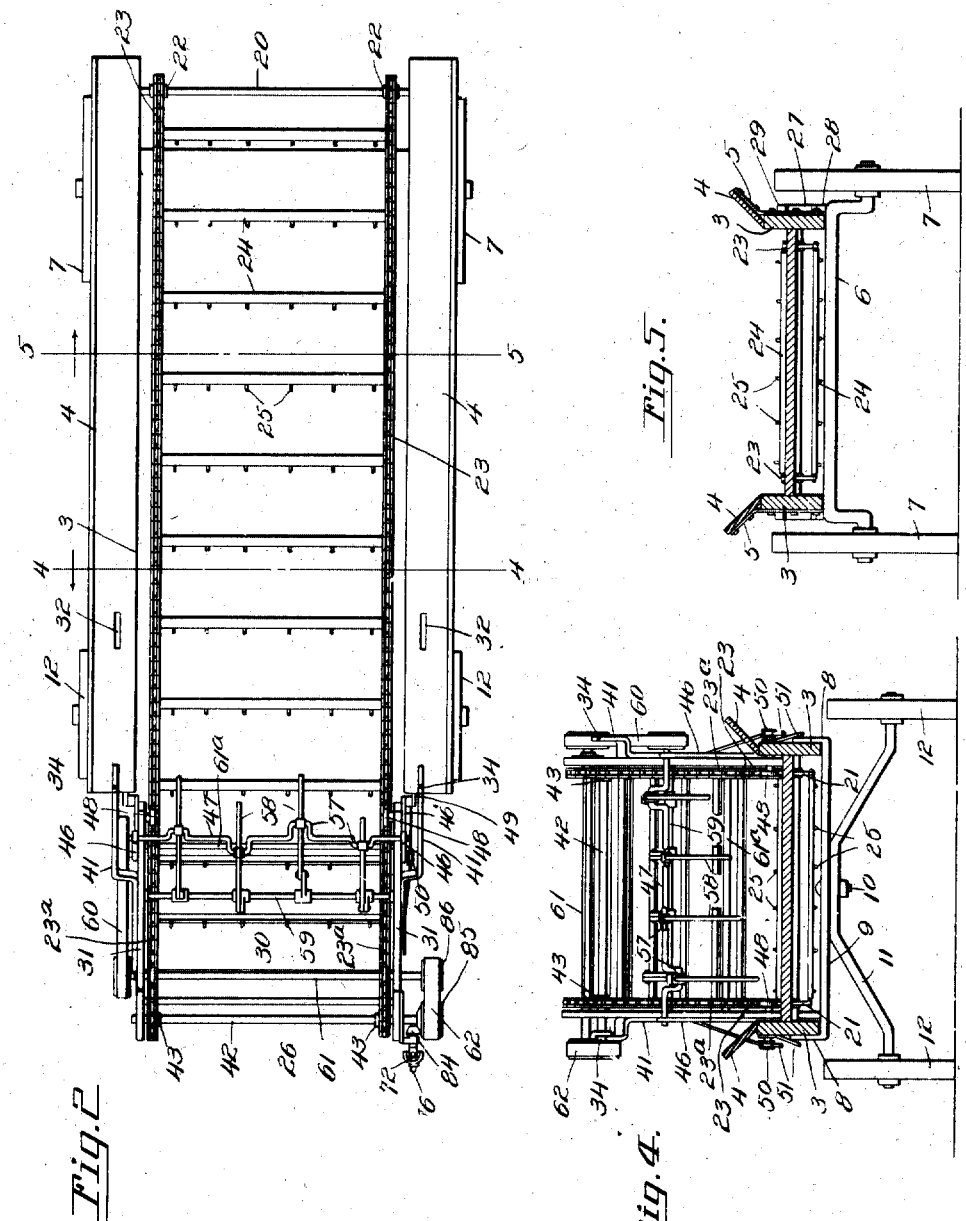

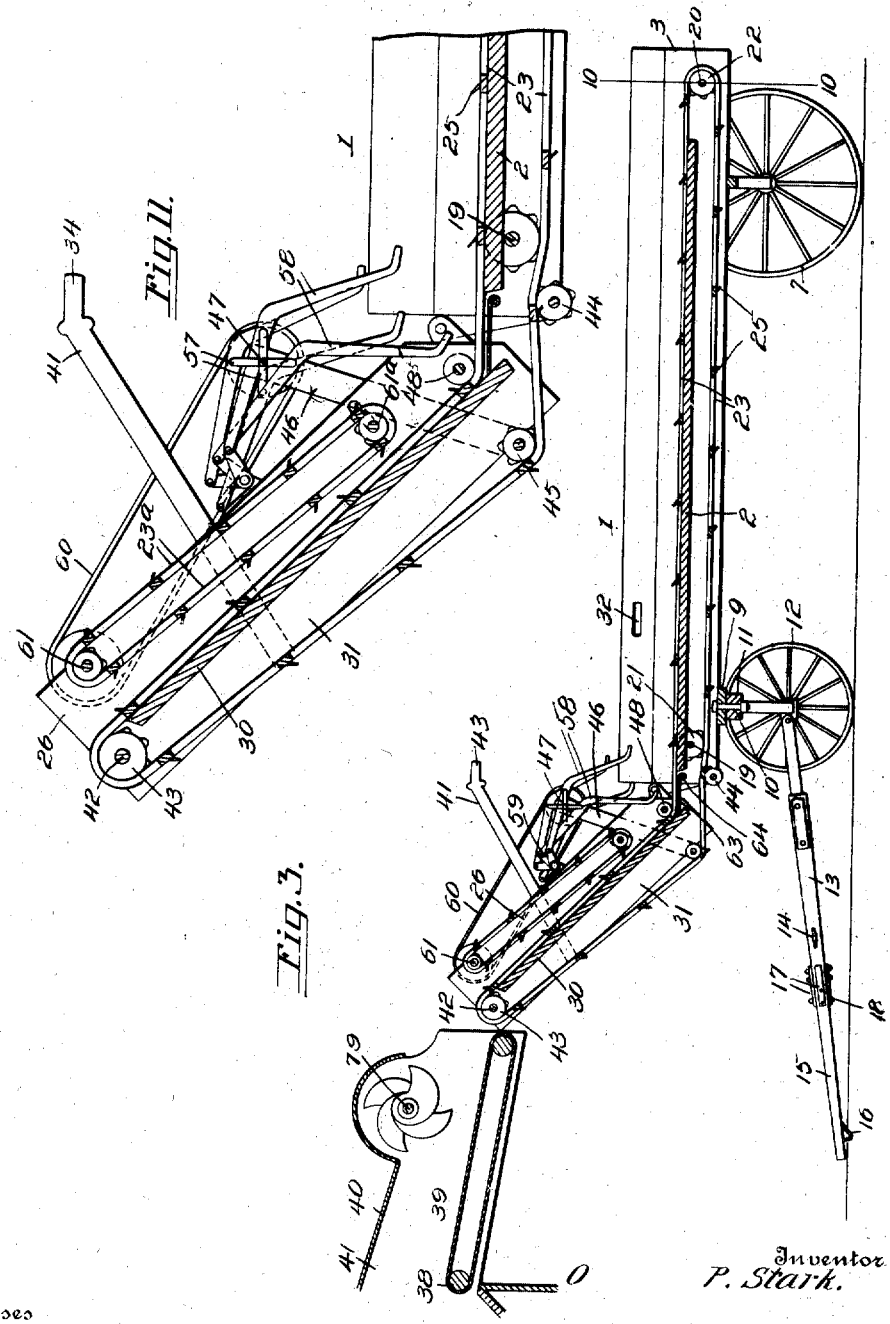

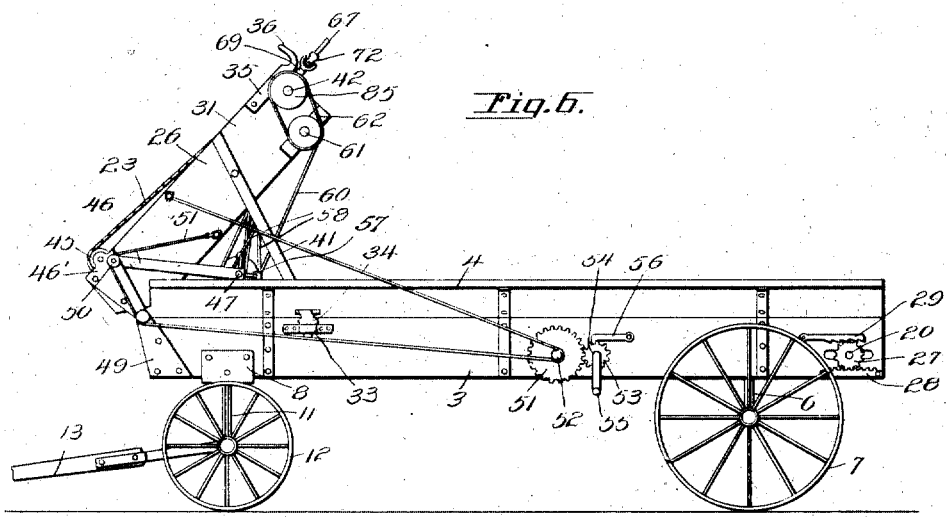

UNITED STATES PATENT OFFICE.

OLA P. STARK, OF NEODESHA, KANSAS, ASSIGNOR OF ONE-HALF TO J. K. DEMOSS, OF NEODESHA, KANSAS.

EXTENSION-FEEDER FOR GRAIN THRESHERS OR SEPARATORS.

1,232,405. Specification of Letters Patent. Patented July 3, 1917.

Application filed May 17, 1916. Serial No. 98,146.

*To all whom it may concern:*

Be it known that I, OLA P. STARK, a citizen of the United States, residing at Neodesha, in the county of Wilson and State of Kansas, have invented new and useful Improvements in Extension-Feeders for Grain Threshers or Separators, of which the following is a specification.

This invention relates to extension feeders for grain threshers or separators, and particularly to a feeder attachment designed to be connected with the separator for delivering the grain to the usual feeder at the mouth of the separator from a point at or near the ground surface, such extension feeder being designed for handling either bundles or loose headed grain, as occasion requires.

The object of the invention is to provide an extension or supplemental feeder of novel construction including a hinged conveyer section adapted to be adjusted to different inclinations as required without compensatory adjustments of the gearing, and which may be sustained in a folded back position when the device is not in use, and further to provide novel means for maintaining the parts of the extension or supplementary feeder in proper working condition and permitting adjustment of the inclined conveyer without loss of grain at the point of angle between the primary and lifting conveyers of said feeder.

With these and other objects in view, which will appear in the course of the subjoined description, the invention consists of the features of construction, combination and arrangement of parts herein fully described and claimed, reference being had to the accompanying drawings in which:—

Figure 1 is a side elevation of a portion of a threshing machine of my improved extension or supplementary feeder, showing the latter in position for use.

Fig. 2 is a top plan view of the same.

Fig. 3 is a vertical longitudinal section.

Figs. 4 and 5 are vertical transverse sections on the lines 4—4 and 5—5 of Fig. 2.

Fig. 6 is a side elevational view showing the inclined conveyer tilted back to normal position and supported for convenience in transporting the extension feeder.

Fig. 7 is a sectional perspective view through the hinged ends of the main frame and inclined feeder frame, showing the arrangement of the hinging connections and the joint closing apron.

Fig. 8 is a detail view of the tumbling rod and associated parts of the primary drive gearing.

Fig. 9 is a detail view showing the main and supplemental tongues and the mode of connecting the same with the front axle and mounting the latter upon the main frame of the feeder.

Fig. 10 is a vertical transverse section on the line 10—10 of Fig. 3.

Fig. 11 is a sectional view similar to Fig. 3, through the inclined conveyer, showing the same on an enlarged scale.

In carrying my invention into practice, I provide a primary horizontal conveyer frame 1, comprising a bottom 2 having sides 3 extending upwardly therefrom and provided at their upper ends with outwardly inclined guide boards 4 secured thereto by brackets 5. The rear end of this frame 1 is mounted upon a rear axle 6 having downwardly bent ends on which are journaled rear supporting wheels 7. To the sides 3 adjacent the forward end of the frame are attached bracket members 8 connected by a bar or plate 9 projecting transversely beneath the bottom 2, to which bar or plate 9 is pivoted, as at 10 a front axle 11, carrying front steering and supporting wheels 12.

Attached to the front axle is a main tongue 13 provided with handles 14 whereby the tongue may be grasped for the manual transportation of the device, which may be steered in an obvious manner. A supplemental tongue 15 may be provided when it is desired to use animal power for transportation, said tongue being provided at its forward end with a hook 16 for engagement with the neck yoke of the draft animals. The adjacent ends of the tongues 13 and 15 are provided with interengaging projections 17 by which they may be fitted together, a bolt 18 being passed therethrough to hold said tongues connected. Journaled in the sides 3 at the front and rear ends of the frame 1 are transverse shafts 19 and 20 on which are mounted sprocket wheels 21 and 22, respectively, the wheels 22 being loose on the shaft 20. Around said sprocket wheels pass parallel longitudinally extending chains 23 connected at intervals by transverse slats 24 provided with spurs or projections 25, thereby forming an endless grain conveyer which has a receiving portion movable horizontally along the frame 1, and an inclined delivery portion mounted upon an inclined frame section 26 at the forward end of the feeder, as hereinafter fully described. Fixed to the ends of the shaft 20 are spur gears 27 engaging rack plates 28 secured to the sides 3 of the frame 1, the ends of which shaft 20 are of angular form to receive a crank of my adjusting tool whereby said shaft may be turned to rotate the gears 27 for travel on the rack plates to adjust the shaft so that the chains 23 may be tightened or loosened as occasion requires. Dogs 29, each having a plurality of teeth, are provided upon the sides 3 for engagement with the gears 27 to lock them against rotation and the shaft 20 in adjusted position.

The front inclined feeder frame 26, which is adjustable to different working positions, comprises a bottom 30 and sides 31, rigidly tied and braced, as hereinafter described. The said frame 26 may be moved rearwardly to an inoperative position, in which position it is adapted to be held by supporting arms 41. These arms 41 are pivotally connected to the sides 31 and their free ends are adapted to be passed downward through slots 32 in the guard boards 4 and to be engaged with keepers 33 on the sides 3 of the frame 1 to hold the conveyer frame 26 in a rearwardly tilted position, said arms being provided with shoulders or enlargements 34 to rest upon the keepers and limit their downward movement. At the upper or free end of the frame 26 are supporting brackets 35 provided with hooks 36 to engage keeper hooks or members 37 on brackets 38 suitably fastened upon the thresher or separator body 39, whereby the inclined frame of the extension feeder may be supported in position for the delivery of the grain to the usual feeder 40 or band cutting and feeding mechanism disposed in proximity to the mouth 41 of the thresher or separator.

The forward or delivery portion of the endless conveyer which extends along the frame 26 passes over a transverse shaft 42 provided with sprocket wheels 43, around which the chains 23 run. The lower stretches of these chains pass over suitable adjustable idlers 44 at the forward end of the frame 1, and also over idlers 45 carried by bracket plates 26', whereby a proper tautness of said chain stretches is maintained in the tilting motions of the frame 26 to different positions of adjustments. Posts 46 rise from lower ends of the sides 31 and are connected at their upper ends by a transverse shaft 47. Mounted on frame 26 are idlers 48 engaging the upper stretches of the chain to compensate for the pivotal movements of the frame 26 and maintain said chain stretches properly taut.

The bracket plates 46' are fixed to the sides 31 of the frame 26 and pivoted, as at 46ª, to bracket plates 49, secured to the adjacent ends of the sides 3 whereby the described adjustments of the frame 26 are permitted. On the bracket plates 49 are suitably arranged idle or guide pulleys 50 around which pass sets of cross cables 51 at each side of the machine, the cables of each set being secured at one end to the sides 31 of the frame 26 so that through opposite movements of such cables the frame 26 may be adjusted to different angular positions to dispose the delivery end of the endless conveyer at the desired inclination, the cables being used as adjusting and supporting means when the extension feeder is in operation, and also used in conjunction with the arms 31 to support the frame 26 in folded or tilted back position for convenience in transporting the extension feeder from place to place. The rear ends of the respective sets of cables are connected with crank gears 51 on a transverse shaft 52 journaled on the frame 1, which gears mesh with adjusting pinions 53 on a transverse shaft 54 provided at one or both ends with a crank 55 by which said crank gears may be turned to operate the cables.

A locking dog or pawl 56 is provided for holding each gear 53 against rotation and to maintain the parts of the adjusting mechanism in adjusted position.

The shaft 47 is provided with cranks 57 engaging kickers 58 pivotally mounted on a cross bar 59, the angularly disposed arms of which kickers are arranged in the path of movement of the grain to loosen up and free the same and thus prevent the grain from accumulating or bunching at the angle between the horizontal and inclined portions of the conveyer. The said shaft 47 receives motion through a belt 60 from a countershaft 61 journaled at the top of the frame 26 which countershaft in turn receives motion through a belt 62 from the shaft 42, said belts passing over suitable pulleys on said shafts. For the purpose of preventing sagging of the conveyer at the angle of intersection between the proximate ends of the frames 1 and 26, and avoiding the formation of a space opening at this point through which the grain might drop, I provide an apron or deflector 63 which is hinged or pivoted to the bottom of the frame 1, as at 64 and has its free edge bearing against the bottom of the frame 26, said apron being adjustable to different angles of inclination with the frame 26 to always keep said passage closed, as will be readily understood. The hinged or pivoted connections 64 are preferably in the form of hinged knuckles through which a pintle pin is passed, whereby the apron may be conveniently attached whenever desired.

I may provide for coöperation with the inclined delivery portion of the conveyer belt 33 a superposed feed belt 23ª consisting of sprocket chains and spurred transverse slats, which sprocket chains pass around sprocket wheels on the shaft 61 and a shaft 61ª, and receive motion from said shaft 61, the belt 23ª thereby operating in conjunction with the inclined section of the belt 23 to insure a positive delivery action and to coöperate with the kickers 58 to prevent the grain from bunching.

In the use of the device, the extension feeder is brought in proper position between the thresher or separator and stack of grain, and the inclined conveyer section adjusted to the proper angle of inclination as circumstances may require, the said extension feeder being coupled to the thresher or separator in the manner specified, the drive shaft 42 of the extension feeder is then coupled through driving connections, hereinafter described, with one of the shafts of the thresher or separator, whereby the endless conveyer is set in motion, so that when the loose grain or bundles are thrown upon the horizontal portion of the conveyer they will be carried by the conveyer up the inclined plane formed by the angular disposition of the frame 26 and carried to the feeder 40, by which the grain is fed through the mouth 41 to the cylinder and concave of the thresher. It will, of course, be understood that the feeder section 26 may be raised or lowered to different angles of inclination according to the elevation of the feeder 40 and the height of the stack, and it will be seen that as the horizontal conveyer section is arranged close to the ground the operators are required only to pitch the grain a comparatively short distance, even when the base of the stack is reached, the necessity of pitching the grain to any material elevation being avoided, with resulting economy in time and labor. It is also evident that the device may be transported with the thresher across the field, manually transported from place to place as required, or hauled by draft animals, and that in long distance hauls the section may be folded or tilted up by means of the adjusting gearing and supported in such position by the arms 31, whereby the adjusting gearing will be relieved from strain and the section 26 disposed and maintained in proper position for travel. When the device is not in use the parts may be disposed in the relations described to enable the extension feeder to be stored in close compass in a barn or other building. It will be observed that provision is made for conveniently tightening the conveyer chains to obviate any slack when occasion requires, and that the pivoted apron permits of any degree of adjustment of the section 26 without interference with the conveyer, while covering the space or joint between the frame sections and obviating loss of grain at such point. It will, of course, be understood that the device may be used for elevating to a thresher or separator loose headed grain or bound bundles or sheaves of grain, and that it may be employed in conjunction with any ordinary type of thresher or separator having either a plain delivery feeder or a combined feeder and band cutter.

The means for transmitting power from the thresher to the drive shaft 42 of the extension feeder comprises a tumbling shaft 65 comprising two main sections 66 and 67, which sections of the shaft are respectively journaled in bearings 68 and 69 on backing plates 70 and 71 fastened, respectively, to a suitable portion of the thresher or separator and to one of the sides of the feeder section 26. Each section of the tumbler shaft includes a pair of members united by a universal or gimbal joint 72, by which the shaft is adapted to assume different angular vertical and lateral positions according to the relative arrangement of the separator and extension feeder due to irregularities in the ground surface or to different inclinations of the inclined section of the extension feeder. The two sections 66 and 67 of the shaft are coupled by a sleeve 73 having an angular or non-circular bore, one end of which sleeve slidably receives the adjacent end of the shaft section 66, which is provided with a pin 74 projecting through and movable in slots 75 in the sleeve, and whereby said shaft section 66 and the sleeve 73 are held from relative disconnection and are coupled for rotary motion in unison and have an intersliding engagement. The other section 67 of the shaft is provided with an angular or non-circular portion 76 conforming to the bore of the sleeve and is fitted to slide within the oposite end of the sleeve and coupled thereto to rotate therewith, the construction being such that the shaft is longitudinally extensible and contractible to accommodate itself to variations in the distance between the driving and driven shafts and to variations in the level of the separator and extension feeder, either resulting from irregularities in the ground surface or to different positions of inclination of the feeder section 26. A coil spring 77 surrounds the shaft section 66 between the universal joint thereof and the proximate end of the sleeve 73 and is interposed between such end of the sleeve and a pin or abutment 78 on said shaft section, said springs serving to permit longitudinal motion of the sleeve while normally maintaining it in working position to prevent disconnection of the shaft sections. To apply this power transmitting mechanism to any thresher or separator it is simply necessary to secure the bracket plate 70 to the thresher, and when it is desired to disconnect the extension feeder, this may be done by simply withdrawing the shaft section 67 from engagement with the sleeve 73, the construction thus being such that the extension feeder may be coupled up with the separator for driving action or uncoupled for removal in a simple, convenient and expeditious manner, and without the trouble, time and annoyance required in applying and adjusting drive belting. The bracket 70 is provided with a stub shaft 79 on which is journaled for rotation a gear-pulley 80 the gear teeth of which mesh with a pinion 81 on the shaft section 66, whereby motion is communicated to said shaft. Around the pulley portion of said gear pulley passes a belt 81 which is also passed around a pulley 82 fixed upon one of the shafts 83 of the separator mechanism, by which the gear pulley is driven from the separator. The other section 67 of the tumbler shaft is provided with a pinion 84 which meshes with the teeth of a gear pulley 85 fixed on the adjacent end of the drive shaft 42 of the extension feeder, by which the moving parts of the extension feeder are driven. From the pulley portion of this gear pulley 85 the belt pulley 62 passes and connects with a belt 86 on the adjacent end of the shaft 61. It will thus be seen that the extension feeder may be brought into juxtaposition to the inlet end of the thresher or separator and quickly and conveniently coupled up to the frame and drive mechanism thereof for operation to feed the grain to the separator, and that the inclined section 26 of the extension feeder may be arranged at any desired working angle according to the conformation of the ground, the height and arrangement of the stack with relation to the separator, etc., the construction of the tumbling shaft allowing the driving parts to be coupled up and efficiently operated irrespective of the position of the extension feeder and its inclined section relative to the delivery feeder of the separator, the conveniences and advantages of which will be manifest. It will, of course, be understood that the shaft 42 may be constructed for coupling engagement with the tumbling shaft at either side of the extension feeder and separator, as circumstances may require, or for the use of two tumbling shafts, one at each side of the separator and feeder, as desired.

I claim:—

1. An extension feeder for threshing machines comprising a transportable main frame, an inclined frame pivotally mounted at one end of the main frame to tilt to different working positions, conveying means mounted on said frames, means upon the main frame and connected with the inclined frame for tilting said inclined frame, an apron arranged to cover the joint between said frame and tiltably adjustable with the inclined frame, keeper members upon the main frame, and arms carried by the inclined frame and adapted for engagement with said keeper members to support the said inclined frame in a rearwardly tilted non-working position.

2. An extension feeder for threshing machines comprising a transportable main frame, an inclined frame pivotally mounted at one end of the main frame to tilt to different working positions, conveying means mounted on said frames, means upon the main frame and connected with the inclined frame for tilting the same to different working positions, keepers upon the main frame, and arms carried by the inclined frame and adapted for engagement with the keepers to support the inclined frame in a rearwardly tilted non-working position.

3. An extension feeder for threshing machines comprising a transportable main frame, an inclined frame arranged at one end of the main frame, brackets fixed to the inclined frame and pivotally engaging the main frame whereby the inclined frame is adjustably mounted for movement to different angular working positions, an apron pivotally mounted on the main frame and extending across the joint or space between the frames and adjustable with the inclined frame, means for adjusting said inclined frame, shafts upon the frames, an endless conveyer arranged to travel about said shafts, and guiding and adjusting means carried by the brackets for maintaining the portions of the conveyer in line with the joint at proper angles in the adjustments of the inclined frame.

In testimony whereof I affix my signature in presence of two witnesses.

OLA P. STARK.

Witnesses:
J. K. DEMOSS,
P. MEDLEY.